United States Patent [19]
Cramaro

[11] Patent Number: 6,007,138
[45] Date of Patent: Dec. 28, 1999

[54] TARPAULIN COVER SYSTEM

[75] Inventor: Michael Cramaro, Satellite Beach, Fla.

[73] Assignee: Cramaro Tarpaulin Systems, Inc., Newark, Del.

[21] Appl. No.: 08/950,853

[22] Filed: Oct. 15, 1997

[51] Int. Cl.$^6$ ...................................................... B60P 7/04
[52] U.S. Cl. ............................... 296/100.11; 296/100.15; 296/100.12
[58] Field of Search .......................... 296/100.11, 100.12, 296/100.18, 100.14, 100.15, 100.16, 100.01, 105

[56] References Cited

U.S. PATENT DOCUMENTS

| | | | |
|---|---|---|---|
| 4,740,029 | 4/1988 | Turek | 296/100.15 |
| 5,112,097 | 5/1992 | Turner, Jr. | 296/100.12 |
| 5,524,953 | 6/1996 | Shaer | 296/105 X |

*Primary Examiner*—D. Glenn Dayoan
*Assistant Examiner*—Jason Morrow
*Attorney, Agent, or Firm*—Connolly, Bove, Lodge & Hutz, LLP

[57] ABSTRACT

A tarpaulin cover system includes a transmission assembly associated with a cable pulley system for selectively moving the tarpaulin to a covering and to uncovering position over the top of a vehicle bed. The transmission assembly includes an upper rod secured to the tarpaulin and a lower rod mounted to the cable. A spring interconnects the upper rod and the lower rod to dispose the two rods in general alignment when the tarpaulin is being moved and to permit the upper rod to be moved toward a horizontal non-alignment condition when the tarpaulin is in its completely covering and completely uncovering positions.

19 Claims, 3 Drawing Sheets

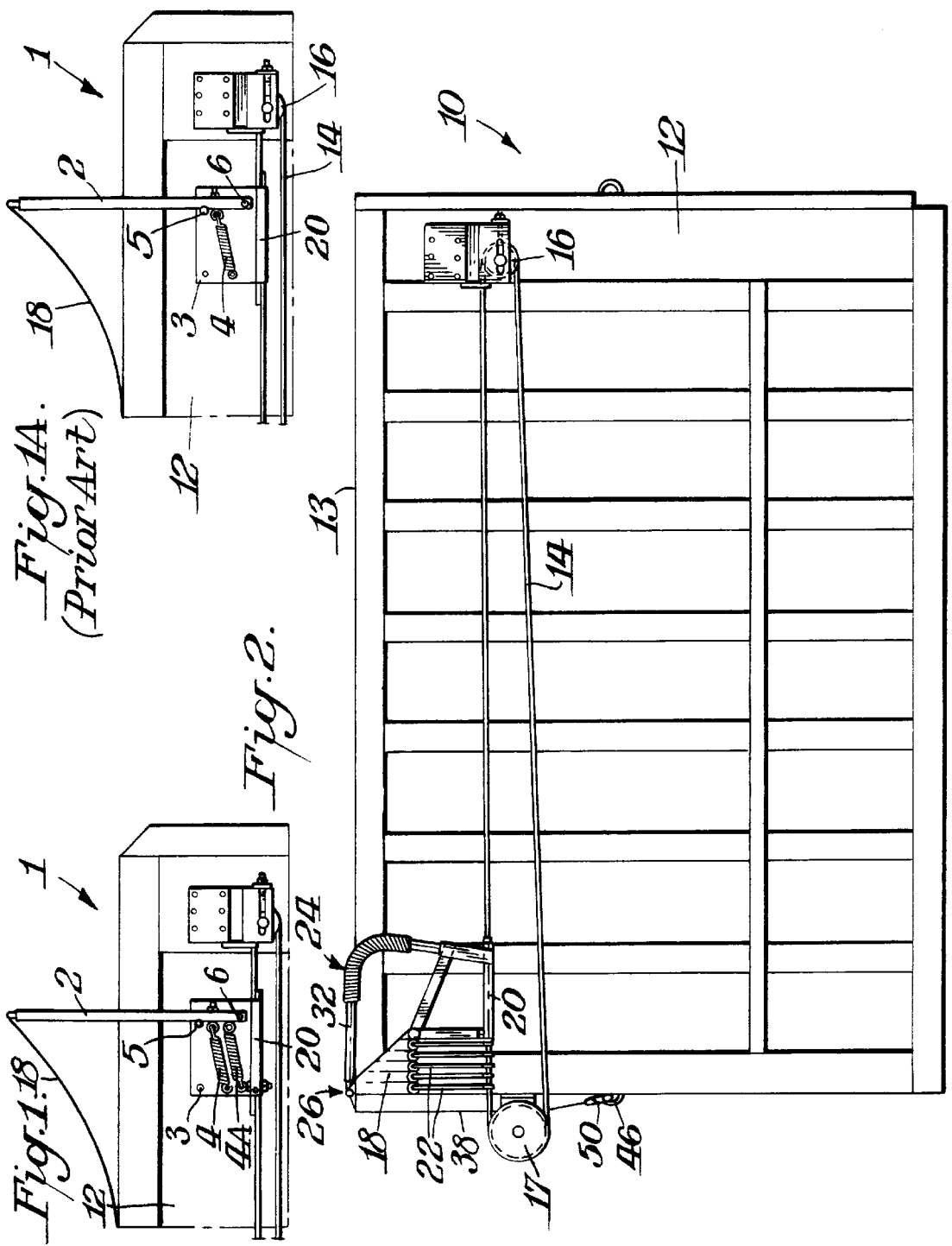

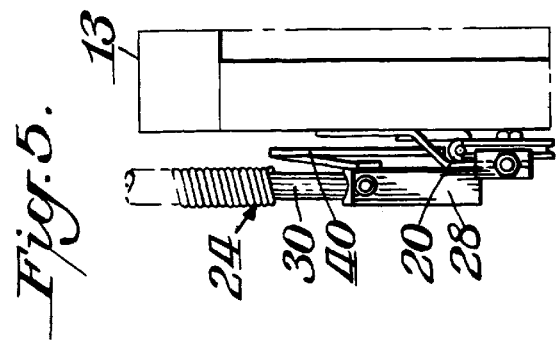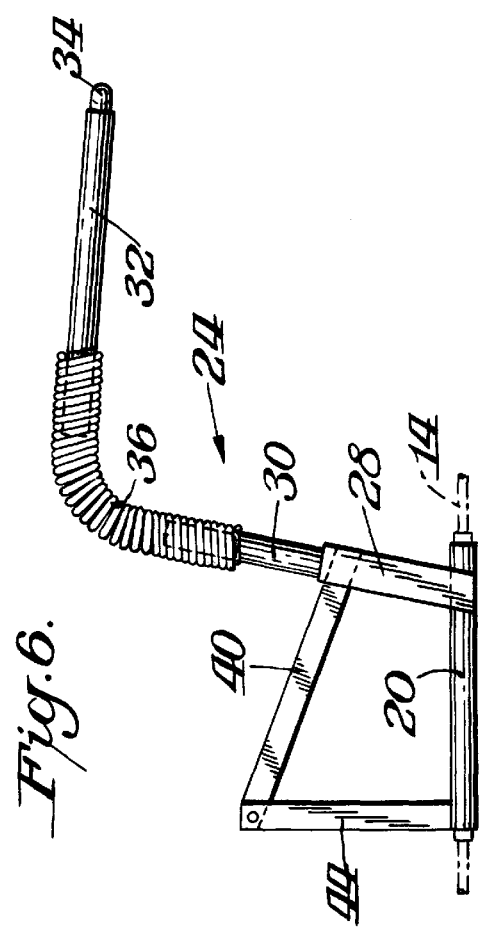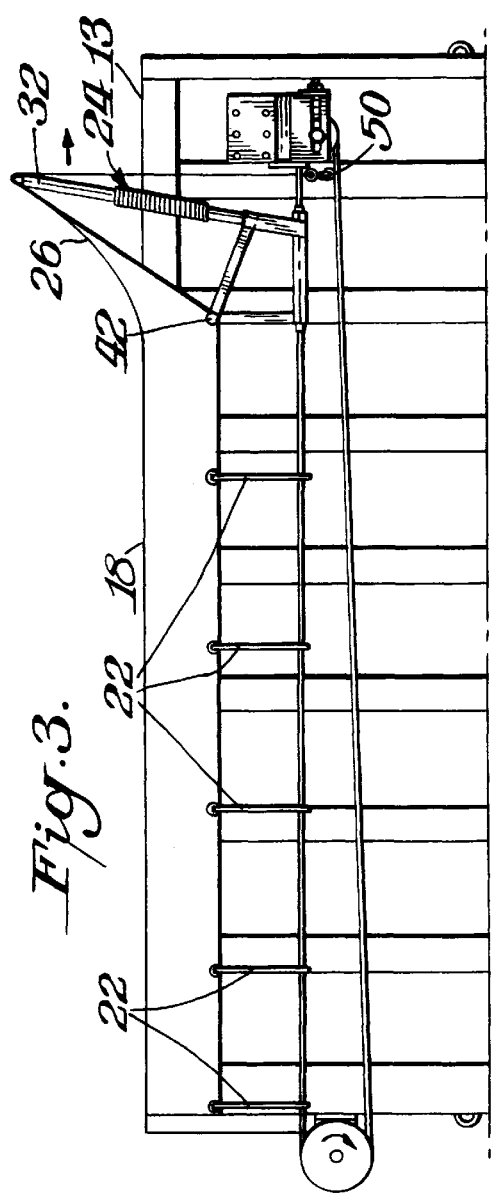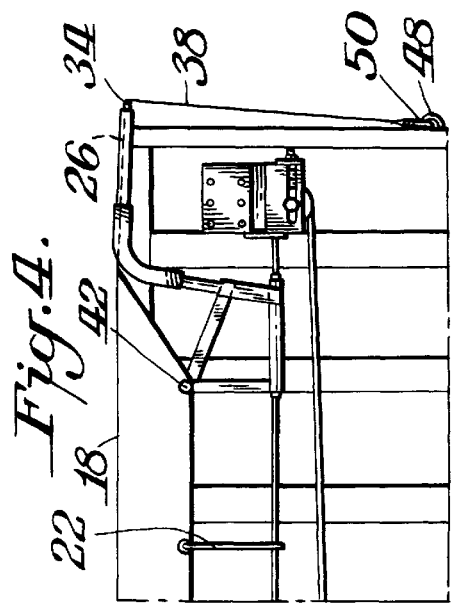

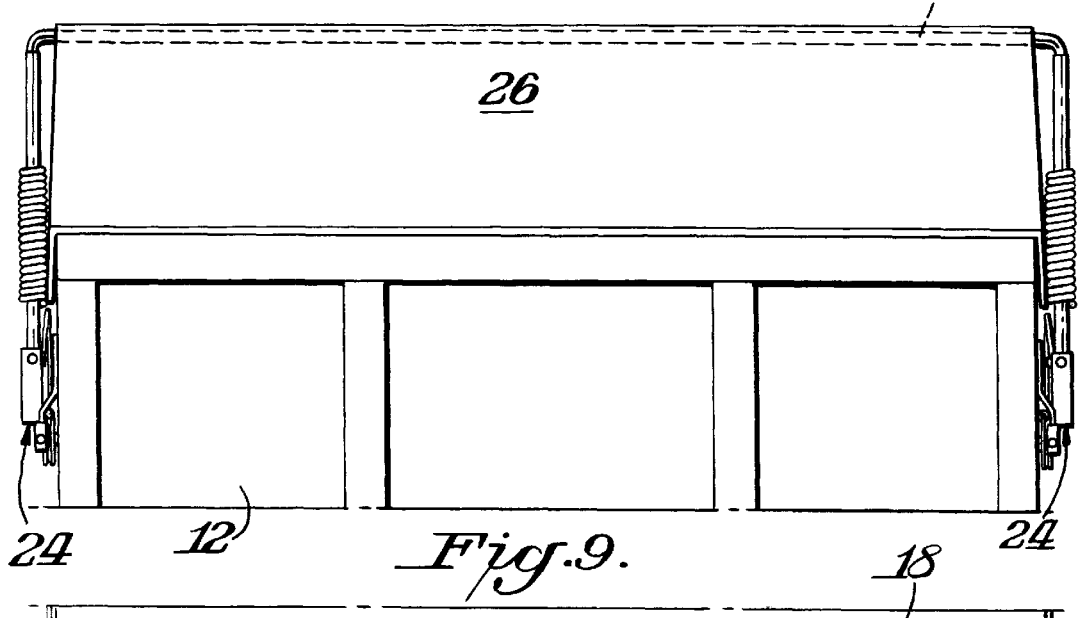
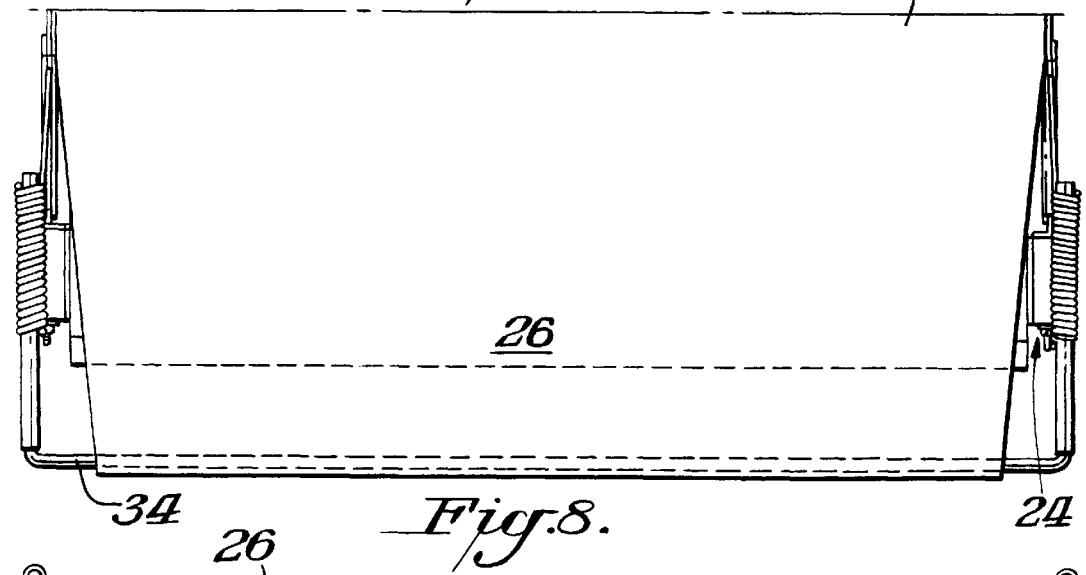
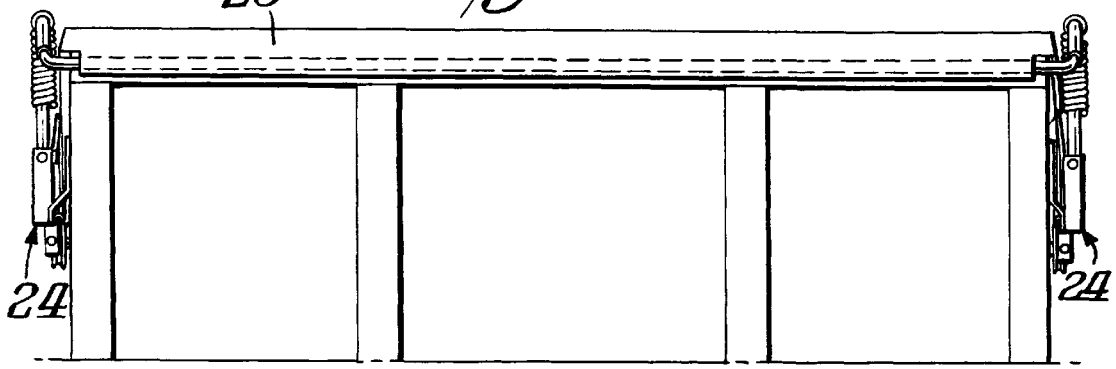

TARPAULIN COVER SYSTEM

BACKGROUND OF THE INVENTION

Tarpaulin cover systems are used for selectively covering and uncovering objects. A common use is in connection with open top beds, particularly vehicles beds such as truck bodies. One advantageous form of mechanism for moving the tarpaulin selectively to its uncovering condition is through the use of a cable system wherein the cable is mounted to a pulley at each end of the bed with a crank connected to one pulley to cause the cable to move in either a forward or a reverse direction. The tarpaulin is provided with a plurality of spaced bows which would extend over the top of the bed. The cable is mounted to the bows. The lead most bow is secured to the cable so as to cause the lead most bow to move in conjunction with the movement of the cable. Thus, the cable movement can cause the bows to be pushed together with the tarpaulin being in an accordion type fashion for uncovering or exposing the top of the vehicle of the bed. Alternatively, by pulling forward on the lead most bow, the remaining bows follow and the bed is covered. This basic system is described in U.S. Pat. No. 4,189,178 which issued to Nello Cramaro.

A variation of the above basic system includes the provision of a mechanism associated with the lead end of the tarpaulin for selectively elevating the lead end of the tarpaulin. As a result, when the tarpaulin is moved to its covering or uncovering condition at least a portion of the tarpaulin is elevated above the top of the bed. Once in its final covered or uncovered condition the lead end is lowered to contact or go over the top edge of the bed.

It would be desirable to provide a transmission assembly for selectively elevating the lead end of the tarpaulin during its movement and then lowering the lead end in a simple and convenient manner.

SUMMARY OF THE INVENTION

An object of this invention is to provide a tarpaulin cover system which includes a transmission assembly for selectively elevating the lead end of the tarpaulin during the movement and then lowering it against the top of the bed at the end of its movement.

A further object of this invention is to provide such a tarpaulin cover system wherein the transmission assembly is easy to operate, uses a small number of parts and thus is inexpensive to manufacture.

A still further object of this invention is to provide such a system which assures maintaining the forward end of the tarpaulin in its lowered position while in its covering and uncovering conditions.

In accordance with this invention the tarpaulin cover system includes providing at least one of the sides (and preferably both sides) of an open type bed with a cable pulley arrangement associated with the tarpaulin. The tarpaulin is mounted at the top of the bed. A transmission assembly is mounted to the cable and to the tarpaulin for selectively moving the tarpaulin to its covering condition and its uncovering condition with the lead end of the tarpaulin elevated above the bed during the movement. The transmission assembly includes a connecting member secured to the cable. A linkage is secured to the connecting member and to the tarpaulin. The linkage comprises a pair of spaced rods interconnected by a joint member for disposing the rods into generally vertical alignment with each other and elevating the lead portion of the tarpaulin during the movement. One of the rods which is a lower rod is secured to the connecting member, while the other rod which is an upper rod is secured to the lead portion of the tarpaulin. An actuating member is secured to the upper rod to move the upper rod toward a generally horizontal orientation out of alignment with the lower rod to lower the lead portion of the tarpaulin. The change in orientation takes place at the joint member.

In a preferred practice of this invention the joint member is a spring which biases the upper rod into alignment with the lower rod but which permits a backward or a forward bending to take place at the spring when a downward force is exerted at the upper end of the upper rod.

In the preferred practice of the invention the actuating member is a cord secured to the upper end of the upper rod. The lower end of the cord is selectively attached to a fastening member such as a hook at one of the end walls of the bed to maintain the upper rod in its generally horizontal condition.

THE DRAWINGS

FIGS. 1 and 1A are side elevational views of a portion of prior art tarpaulin cover systems;

FIG. 2 is a side elevational view of a tarpaulin cover system in accordance with this invention in the open condition of the bed;

FIG. 3 is a view similar to FIG. 2 in a position wherein the tarpaulin is substantially in its closed condition but the lead end is not yet lowered;

FIG. 4 is a view similar to FIG. 3 showing the lead end of the tarpaulin in its completely closed condition;

FIG. 5 is an end elevational view of the tarpaulin cover system shown in FIGS. 2–4;

FIG. 6 is an enlarged view of a portion of the tarpaulin cover system shown in FIG. 4;

FIG. 7 is an end elevational view of the tarpaulin system shown in FIG. 3;

FIG. 8 is an end elevational view of the tarpaulin system shown in FIG. 4; and

FIG. 9 is a top plan view of the tarpaulin cover system shown in FIG. 8.

DETAILED DESCRIPTION

FIG. 1A illustrates a portion of a tarpaulin cover system 1 using a known approach for selectively covering and uncovering the top of a vehicle bed 12. As shown therein system 1 includes a cable 14 mounted around a pulley 16 at the back end of the vehicle bed. The tarpaulin 18 has its lead end secured to a rigid rod 2 which is mounted to a plate 3. Plate 3 has a sleeve 20 at its lower end through which the cable 14 passes with the sleeve being locked to the cable for joint movement therewith. A spring 4 urges the rod 2 to its vertical position against a stop pin 5 mounted on the plate 3. Rod 2 is mounted about a shaft 6 for rotation in a direction away from the stop member 5 to thereby lower the lead end of tarpaulin 18.

FIG. 1 shows another known system which is a variation of the approach shown in FIG. 1A. As shown in FIG. 1, the bar or sleeve 20 remains straight at all times. When forward tension is applied, the plate 3 pivots 90° in the counterclockwise or forward position of the vehicle. Spring 4A assists in this pivoting action by being secured to sleeve 20 directly above the pivot point of sleeve 20 and plate 3, with the opposite end of spring 4A secured to plate 3.

FIGS. 2–9 illustrate a tarpaulin cover system 10 in accordance with this invention. As shown therein the system 10 also is utilized for covering the top 13 of an open top vehicle bed 12. The system 10 includes a cable 14 mounted around a rear pulley 16 and around a front pulley 17 which would be located near the cab of the vehicle. Some drive mechanism, such as a crank would be associated with the front pulley 17. Reference is had, for example, to Nello Cramaro's U.S. Pat. No. 4,189,178, the details of which are incorporated herein by reference thereto.

As shown in FIGS. 7–9 a pulley cable system and transmission assembly would preferably be provided on each side of the vehicle bed 12. Since the structure on both sides would be identical only one set of structure will be described in detail.

As shown in FIG. 3, a tarpaulin 18 is fixedly mounted at one end to the front end of the bed near the drive pulley 17. The tarpaulin has a number of S-hooks or chains or other connectors 22 which are slidably mounted on cable 14. The lead most bow, however, is secured to sleeve 20, as later described, which in turn is fixed to cable 14. Thus, the movement of cable 14 is transmitted to sleeve 20 which in turn causes the lead bow to move in a forward or a rearward direction.

When the tarpaulin 18 is in its uncovering position with the top 13 of bed 12 not quite completely exposed, the tarpaulin assumes the accordion type arrangement shown in FIG. 2. When the tarpaulin is being moved to or from its covering condition, a transmission assembly 24 which transmits motion elevates the lead end 26 of the tarpaulin so that during the movement of the tarpaulin the lead end 26 is out of contact with the upper edge 13 of bed 12. This facilitates the back and forth movement of the tarpaulin and minimizes wear that would otherwise occur if the lead end were in constant sliding contact with the top 13 of the bed 12. Elevating the lead end of the tarpaulin also gives clearance for the load or contents within the truck bed such as items that might extend above the top of the bed.

FIG. 6 illustrates the components of transmission assembly 24. As shown therein transmission assembly 24 includes a bracket or brace member 28 mounted to one end of sleeve 20. A lower rod 30 is secured to brace 28. Lower rod 30 terminates just below top 13 of bed 12 or at any other suitable location. See FIGS. 2–4. An upper rod 32 is secured to lead end 26 of tarpaulin 18 at outer end 34 of rod 32 in any suitable manner. Upper rod 32 and lower rod 30 in turn are secured to each other by a joint member preferably in the form of a spring 36. The function of the joint member 36 is to provide a connection whereby the rods may be in generally vertical alignment with each other (at a slight angle to top 13) such as shown in FIG. 3. This alignment is maintained during the movement of the tarpaulin when the components are in their normal condition. The upper rod 32 may be pivoted or bent to a generally horizontal condition either to the right or to the left of the lower rod, such as shown in FIGS. 2 and 4, when the tarpaulin is in its completely uncovering and covering conditions, respectively.

Any suitable joint member may be used which would accomplish the above features. A spring is particularly preferred because of its multiple capabilities. The spring has resiliency whereby when the spring tends to assume its straight condition it would automatically dispose the upper rod 32 in alignment with the lower rod 30. Because the spring is not a rigid member it is also capable of being bent in virtually any direction. To accomplish such bending an actuator member 38 is secured to the outer end 34 of upper rod 32 in any suitable manner. Actuating member or cord 38 is of sufficient length that it can readily be reached by a user. Thus, a user pulling down on cord 38 would, in turn, cause the upper rod 32 to be pulled toward a horizontal position. If the pulling is to the left then the rod 32 moves to the left such as shown in FIG. 2. If the pulling is to the right then the rod 32 moves to the right such as shown in FIGS. 4 and 6. Although the drawings illustrate the actuating member to be a cord other actuating members could be used such as a flexible chain or a rigid link.

The use of an actuating member, such as cord 38, in combination with the spring is also advantageous in that it provides structure for assuring that when the upper rod 32 is moved to its generally horizontal position it will remain in that position thereby maintaining the lead end 26 of the tarpaulin 28 in a lowered position which could be in contact with the upper edge or top 13 of bed 12 so it will not exceed legal height limit.

FIG. 6 also illustrates the transmission assembly 24 to include a link or connecting member 40 which extends from the brace 28 to a lower edge of the tarpaulin 42 as shown in FIGS. 2–4. Link or connecting member 40 is in turn also connected to vertical link or connecting member 44 which is secured to an end of sleeve 20 remote from brace 28.

FIG. 6 illustrates three separate links 28,40,44 connecting sleeve 20 and rod 30 and tarpaulin 18 to each other. An alternative would be to replace some or all of the links with a plate in solid or skeletal form connected to sleeve 20, rod 30 and tarpaulin 18. The separate links are preferred, however, because of their lighter weight and strength. The links are, for example, lighter than a steel plate and stronger than aluminum.

When tarpaulin 18 is in its uncovering position shown in FIG. 2 cord 38 is anchored to a fastener 46 at the front wall of bed 12. A ratchet is preferably used on the front to insure positive contact of crossbar 34 to the bed further insuring that the bar is kept below the legal height limit and not able to be caught by wind. Fastener 46 may be a D-ring or loop, as illustrated, or a hook or other projection to facilitate the cord being tied or otherwise secured to the fastener. While in this condition upper rod 32 is bent downwardly toward the cab of the vehicle. When it is desired to cover the vehicle, cord 38 is released from fastener 46. Rod 32 then springs into alignment with lower rod 30 to the position of alignment shown in FIG. 3. While in this position of alignment drive pulley 17 is actuated and the transmission assembly is carried by sleeve 20 toward the rear end of bed 12 thus carrying with it the lead end 26 of tarpaulin 18 to progressively cover the top 13 of bed 12.

FIG. 3 shows the various components when the covering is substantially completed. When the covering is completed cord 38 is pulled downwardly toward the rear end of bed 12 so that upper rod 32 is then moved in a generally horizontal position until the lead end 26 of tarpaulin 18 rests on the top 13 of bed 12 as shown in FIG. 4. Cord 38 is then anchored to fastener or hook 48 at the rear end of bed 12. This may be accomplished, for example, by providing cord 38 with a snap fastener 50 at its end to engage the ring 48 or the ring 46. A suitable releasable hook 50 may include a depressable spring arm to selectively open or close the hook similar to a dog catch. Where fasteners 46,48 are downwardly open hooks, member 50 may simply be a loop.

A further advantage of spring 36 is that it would permit the cord 38 to be lowered sufficiently for its loop 50 to move below and then be raised into engagement with the hook 46 or 48 whereupon the spring would then urge the cord upward to assure the engagement of the loop on the hook.

The use of a joint member, particularly in the form of a spring, thus results in a tarpaulin cover system that is convenient to operate while providing an effective mode of operation, and inexpensive tube manufactured and easy to maintain.

What is claimed is:

1. In a tarpaulin cover system for selectively covering and uncovering the open top of a bed of a vehicle, in combination, a cable is mounted around a spaced pair of pulleys on at least one side of said bed with one of said pulleys being at one end of said bed and the other of said pulleys is at the opposite end of said bed, a tarpaulin mounted at the top of said bed, a transmission assembly mounted to said cable and to said tarpaulin for selectively moving said tarpaulin to a covering condition and to an uncovering condition with respect to said bed while at least a lead portion of said tarpaulin is elevated above said bed, the improvement being in that said transmission assembly comprises a connecting member secured to said cable for joint movement with said cable, a linkage secured to said connecting member and to said tarpaulin, said linkage comprising a pair of spaced rods interconnected by a joint member for disposing said rods into generally vertical axial alignment with each other to elevate said lead portion of the tarpaulin during its movement, one of said rods being a lower rod secured to said connecting member, the other of said rods being an upper rod secured to said lead portion said tarpaulin, said joint member being located between and connected to the upper end of said lower rod and the lower end of said upper rod, an actuating member secured to said upper rod for moving said upper rod toward a generally horizontal orientation out of alignment with said lower rod to lower said lead portion of said tarpaulin, and the change in orientation of said upper rod taking place at said joint member.

2. In a tarpaulin cover system for selectively covering and uncovering the open top of a bed of a vehicle, in combination, a cable is mounted around a spaced pair of pulleys on at least one side of said bed with one of said pulleys being at one end of said bed and the other of said pulleys is at the opposite end of said bed, a tarpaulin mounted at the top of said bed, a transmission assembly mounted to said cable and to said tarpaulin for selectively moving said tarpaulin to a covering condition and to an uncovering condition with respect to said bed while at least a lead portion of said tarpaulin is elevated above said bed, the improvement being in that said transmission assembly comprises a connecting member secured to said cable for joint movement with said cable, a linkage secured to said connecting member and to said tarpaulin, said linkage comprising a pair of spaced rods interconnected by a joint member for disposing said rods into generally vertical alignment with each other to elevate said lead portion of the tarpaulin during its movement, one of said rods being a lower rod secured to said connecting member, the other of said rods being an upper rod secured to said lead portion said tarpaulin, an actuating member secured to said upper rod for moving said upper rod toward a generally horizontal orientation out of alignment with said lower rod to lower said lead portion of said tarpaulin, the change in orientation of said upper rod taking place at said joint member, and said joint member is a spring which permits said upper rod to be selectively moved in a plurality of different directions from said generally vertical alignment with said lower rod to said generally horizontal orientation.

3. The system of claim 2 wherein said actuating member is a cord.

4. The system of claim 3 wherein said bed includes a front end and a rear end, said tarpaulin being fixedly mounted to said front end and moveably mounted toward and away from said rear end, and anchor structure on one of said ends of said bed to which said actuating member may be secured for maintaining said upper rod in its generally horizontal orientation.

5. The system of claim 4 including anchor structure at each of said front end and said rear end of said bed.

6. The system of claim 5 wherein said anchor structure comprises a closed ring at said rear end and a ratchet at said front end.

7. The system of claim 6 wherein said cord includes a snap fastener for securement to said ring.

8. The system of claim 7 wherein said bed includes a pair of opposite side walls between said front end and said rear end, and said tarpaulin cover system being mounted on each of said side walls.

9. The system of claim 5 wherein said connecting member is a sleeve mounted around said cable.

10. The system of claim 9 wherein said transmission assembly further includes a brace mounted to said sleeve at one end of said sleeve disposed toward said rear end of said bed, said lower rod being connected to said brace and in general alignment therewith, said lower rod being located entirely below said top of said bed, a link connecting said brace to said lead end of said tarpaulin at a location separate from the connection of said upper rod to said lead end of said tarpaulin, and a further link connecting said lead end of said tarpaulin to an end of said sleeve opposite said end of said sleeve to which said brace is connected.

11. The system of claim 10 wherein said bed includes a pair of opposite side walls between said front end and said second end, and said tarpaulin cover system being mounted on each of said side walls.

12. The system of claim 5 wherein said transmission assembly includes a plate connecting said sleeve and said lower rod and said tarpaulin to each other.

13. The system of claim 2 wherein said bed includes a pair of opposite side walls, and said tarpaulin cover system being mounted on each of said side walls.

14. The system of claim 1 wherein said actuating member is a cord.

15. In a tarpaulin cover system for selectively covering and uncovering the open top of a bed of a vehicle, in combination, a cable is mounted around a spaced pair of pulleys on at least one side of said bed with one of said pulleys being at one end of said bed and the other of said pulleys is at the opposite end of said bed, a tarpaulin mounted at the top of said bed, a transmission assembly mounted to said cable and to said tarpaulin for selectively moving said tarpaulin to a covering condition and to an uncovering condition with respect to said bed while at least a lead portion of said tarpaulin is elevated above said bed, the improvement being in that said transmission assembly comprises a connecting member secured to said cable for joint movement with said cable, a linkage secured to said connecting member and to said tarpaulin, said linkage comprising a pair of spaced rods interconnected by a joint member for disposing said rods into generally vertical alignment with each other to elevate said lead portion of the tarpaulin during its movement, one of said rods being a lower rod secured to said connecting member, the other of said rods being an upper rod secured to said lead portion said tarpaulin, an actuating member secured to said upper rod for moving said upper rod toward a generally horizontal orientation out of alignment with said lower rod to lower said lead portion of said tarpaulin, the change in orientation of said upper rod taking place at said joint member, said bed including a front end and a rear end, said tarpaulin being fixedly mounted to said front end and moveably mounted toward and away from said rear end, and anchor structure on each of said front and rear ends of said bed to which said actuating member may be secured for maintaining said upper rod in its generally horizontal orientation.

16. The system of claim 1 wherein said bed includes a pair of opposite side walls, and said tarpaulin cover system being mounted on each of said side walls.

17. In a tarpaulin cover system for selectively covering and uncovering the open top of a bed of a vehicle, in combination, a cable is mounted around a spaced pair of pulleys on at least one side of said bed with one of said pulleys being at one end of said bed and the other of said pulleys is at the opposite end of said bed, a tarpaulin mounted at the top of said bed, a transmission assembly mounted to said cable and to said tarpaulin for selectively moving said tarpaulin to a covering condition and to an uncovering condition with respect to said bed while at least a lead portion of said tarpaulin is elevated above said bed, the improvement being in that said transmission assembly comprises a connecting member secured to said cable for joint movement with said cable, a linkage secured to said connecting member and to said tarpaulin, said linkage comprising a pair of spaced rods interconnected by a joint member for disposing said rods into generally vertical alignment with each other to elevate said lead portion of the tarpaulin during its movement, one of said rods being a lower rod secured to said connecting member, the other of said rods being an upper rod secured to said lead portion said tarpaulin, an actuating member secured to said upper rod for selectively moving said upper rod toward a generally horizontal orientation out of alignment with said lower rod to lower said lead portion of said tarpaulin to one position on one side of said lower rod and to a second position on the other side of said lower rod, and the change in orientation of said upper rod taking place at said joint member.

18. The system of claim 17 wherein said bed includes a front end and a rear end, and anchor structure on each of said front and rear ends of said bed to which said actuating member may be selectively secured for maintaining said upper rod in its generally horizontal orientation.

19. The system of claim 17 wherein said actuating member is a cord.

* * * * *